(12) United States Patent
Wehmeyer

(10) Patent No.: US 6,429,166 B1
(45) Date of Patent: Aug. 6, 2002

(54) METHOD FOR PREPARING METAL CYANIDE CATALYST/POLYOL INITIATOR SLURRIES

(75) Inventor: Richard M. Wehmeyer, Lake Jackson, TX (US)

(73) Assignee: Dow Global Technologies Inc., Midland, MI (US)

( * ) Notice: Subject to any disclaimer, the term of this patent is extended or adjusted under 35 U.S.C. 154(b) by 0 days.

(21) Appl. No.: 09/574,847

(22) Filed: May 19, 2000

(51) Int. Cl.[7] .......................... B01J 27/26; C08G 65/28
(52) U.S. Cl. ...................... 502/175; 502/169; 528/412; 528/414
(58) Field of Search ................ 502/175, 169; 528/412, 414

(56) References Cited

U.S. PATENT DOCUMENTS

| | | | |
|---|---|---|---|
| 3,278,457 A | 10/1966 | Milgrom | 260/2 |
| 4,472,560 A | 9/1984 | Kuyper et al. | 526/120 |
| 4,477,589 A | 10/1984 | Van der Hulst et al. | 502/169 |
| 5,470,813 A | 11/1995 | Le-Khac | 502/175 |
| 5,482,908 A | 1/1996 | Le-Khac | 502/156 |
| 5,639,705 A | 6/1997 | Bowman et al. | 502/175 |
| 5,689,012 A | 11/1997 | Pazos et al. | 568/619 |
| 5,714,639 A | 2/1998 | Bowman et al. | 568/620 |
| 5,767,323 A | 6/1998 | Televantos et al. | 568/613 |
| 5,777,177 A | 7/1998 | Pazos | 568/679 |
| 5,998,327 A | 12/1999 | Hofmann | 502/175 |

FOREIGN PATENT DOCUMENTS

| | | | |
|---|---|---|---|
| DE | 19809538 A1 | * | 9/1999 |
| DE | 198 09 538 A 1 | | 9/1999 |
| WO | WO 99/44739 A1 | * | 9/1999 |
| WO | WO 99/44940 | | 9/1999 |
| WO | WO 2000/74843 A1 | * | 12/2000 |
| WO | WO 2000/74844 A1 | * | 12/2000 |
| WO | WO 2000/74845 A1 | * | 12/2000 |
| WO | WO 2001/4178 A1 | * | 1/2001 |
| WO | WO 2001/4183 A1 | * | 1/2001 |

* cited by examiner

*Primary Examiner*—Robert E. L. Sellers

(57) ABSTRACT

Metal cyanide catalyst dispersions in initiator compounds are prepared by precipitating the catalyst in an inert organic compound, mixing the resulting slurry with the initiator and stripping off the inert organic compound. Using this method, an active alkylene oxide polymerization catalyst is prepared. It is not necessary to use a separate organic complexing agent in the preparation.

10 Claims, No Drawings

METHOD FOR PREPARING METAL CYANIDE CATALYST/POLYOL INITIATOR SLURRIES

BACKGROUND OF THE INVENTION

This invention relates to methods for making metal cyanide catalysts complexes and to methods for polymerizing alkylene oxides in the presence of a metal cyanide catalyst.

Polyethers are prepared in large commercial quantities through the polymerization of alkylene oxides such as propylene oxide and ethylene oxide. This polymerization reaction is usually conducted in the presence of an initiator compound and a catalyst. The initiator compound usually determines the functionality (number of hydroxyl groups per molecule of the polymer) and in some instances imparts some desired functionality. The catalyst is used to provide an economical rate of polymerization.

Metal cyanide complexes are becoming increasingly important alkylene oxide polymerization catalysts. These complexes are often referred to as "double metal cyanide" or "DMC" catalysts, and are the subject of a number of patents, including, for example, U.S. Pat. Nos. 3,278,457, 3,278,458, 3,278,459, 3,404,109, 3,427,256, 3,427,334, 3,427,335 and 5,470,813, among many others. In some instances, these complexes provide the benefit of fast polymerization rates and narrow polydispersities. Additionally, these catalysts are associated with the production of polyethers having very low levels of monofunctional unsaturated compounds.

Development efforts have focussed mainly on one specific metal cyanide catalyst complex, zinc hexacyanocobaltate, complexed with a specific complexing agent, t-butanol. The catalyst is typically prepared in a multistep process. First, separate solutions of zinc chloride and potassium hexacyanocobaltate are prepared. These solutions are then mixed together, followed immediately by adding a mixture of water and the complexing agent, t-butanol. A catalyst complex precipitates and is recovered and washed multiple times with mixtures of water and t-butanol. This washing process removes unwanted occluded ions, particular potassium and chlorine, and contributes the complexing agent to the structure of the catalyst complex. Often, a polyether polyol is included in one or more of these washings. Finally, the catalyst complex is dried and ground. It is then mixed with an initiator compound and an alkylene oxide to prepare the desired polyether.

The process just described is complex, requiring several washing steps. It also requires that excesses of water and t-butanol be used. The t-butanol complexing agent itself causes the complex to be difficult to handle. Often, a polyether polyol must be added to facilitate easy handling of the catalyst complex.

Thus, it would be desirable to provide a less expensive, more convenient method for preparing a metal cyanide catalyst complex and a simple method for using such catalyst complexes.

SUMMARY OF THE INVENTION

In one aspect, this invention is a method for preparing an active metal cyanide catalyst, comprising
(I) mixing;
 a) a solution or dispersion of a metal cyanide compound in a first inert organic compound or mixture thereof, wherein the metal cyanide compound is represented by the general formula $H_w[M^1(CN)_r(X)_t]$ wherein
  $M^1$ is a transition metal ion;
  each X represents a group other than cyanide that coordinates with the $M^1$ ion; r is from 4 to 6, t is from 0–2, and w represents the absolute value of the valence of the $M^1(CN)_r(X)_t$ group; and
 b) a solution or dispersion of a metal salt in a second inert organic compound or mixture thereof, wherein the metal salt is represented by the general formula $M_xA_y$, wherein M is a metal ion that forms an insoluble precipitate with the metal cyanide grouping $M^1(CN)_r(X)_t$, A represents an anion, and x and y are integers that balance the charges in the metal salt, and said second inert organic compound is the same as or miscible with said first inert organic compound or mixture thereof, said mixing being performed under conditions such that a precipitate forms and is suspended in said first and second inert organic compounds;
(II) dispersing the resulting mixture in an initiator compound, and
(III) removing said first inert organic compound or mixture and said second inert organic compound or mixture from the resulting dispersion.

This method provides a convenient way to make metal cyanide catalysts as fine dispersions in an initiator compound. Preferably, no separate organic complexing agent compound is present in the preparation, so that the costs associated with the use of the complexing agent are eliminated. In this process, multiple process steps, particularly catalyst washings, are eliminated. Costs associated with drying the catalyst complex and handling solids are also reduced or eliminated.

In a second aspect, this invention is a method for preparing an active metal cyanide catalyst, comprising
(I) mixing;
 a) a first solution or dispersion of a metal cyanide compound in an initiator compound or mixture thereof, wherein the metal cyanide compound is represented by the general formula $H_w[M^1(CN)_r(X)_t]$ wherein
  $M^1$ is a transition metal ion;
  each X represents a group other than cyanide that coordinates with the $M^1$ ion; r is from 4 to 6, t is from 0–2, and w represents the absolute value of the valence of the $M^1(CN)_r(X)_t$ group; and
 b) a second solution or dispersion of a metal salt in said initiator compound or mixture thereof, wherein the metal salt is represented by the general formula $M_xA_y$, wherein M is a metal ion that forms an insoluble precipitate with the metal cyanide grouping $M^1(CN)_r(X)_t$, A represents an anion, and x and y are integers that balance the charges in the metal salt,
said mixing being performed under conditions such that a precipitate forms and is suspended in said initiator compound or mixture thereof In a third aspect, this invention is a process wherein a dispersion of the first or second aspect is mixed with an alkylene oxide and the resulting mixture subjected to conditions sufficient to polymerize the alkylene oxide to form a poly(alkylene oxide) based on said initiator compound.

DETAILED DESCRIPTION OF THE INVENTION

In the first aspect of the invention, a solution or dispersion of a metal compound in an organic compound is mixed with a solution or dispersion of a metal salt in an organic compound. The metal compound is represented by the general formula $H_w[M^1(CN)_r(X)_t]$, in which $M^1$, X, r, t and w are as described before.

$M^1$ is preferably $Fe^{+3}$, $Fe^{+2}$, $Co^{+3}$, $Co^{+2}$, $Cr^{+2}$, $Cr^{+3}$, $Mn^{+2}$, $Mn^{+3}$, $Ir^{+3}$, $Ni^{+2}$, $Rh^{+3}$, $Ru^{+2}$, $V^{+4}$ and $V^{+5}$. Among the foregoing, those in the plus-three oxidation state are more preferred. $Co^{+3}$ and $Fe^{+3}$ are even more preferred and $Co^{+3}$ is most preferred.

Preferred groups X include anions such as halide (especially chloride), hydroxide, sulfate, carbonate, oxalate, thiocyanate, isocyanate, isothiocyanate, $C_{1-4}$ carboxylate and nitrite ($NO_2$—), and uncharged species such as CO, $H_2O$ and NO. Particularly preferred groups X are NO, $NO_2$— and CO.

r is preferably 5 or 6, most preferably 6; t is preferably 0 or 1, most preferably 0. w is usually 2 or 3, and is most typically 3. In most cases, r+t will equal six.

Mixtures of two or more metal cyanide compounds can be used. In addition, the solution may also contain compounds that have the structure $H_w M^2(X)_6$, wherein $M^2$ is a transition metal and X is as before. $M^2$ may be the same as or different from $M^1$. The X groups in any $M^2(X)_6$ do not have to be all the same.

The organic compound is one that meets several requirements. First, it is inert to the metal cyanide compound and any $H_w M^2(X)_6$ compounds that may be present. In addition, it is inert to the metal salt. It is not a solvent for the metal cyanide catalyst complex that is formed in the reaction of the metal salt and the metal cyanide compound. Preferably, the organic compound is a solvent for the metal cyanide compound and any $H_w M^2(X)_6$ compounds that may be used. In addition, the organic compound preferably is miscible with the initiator compound that is used in the subsequent alkylene oxide polymerization. Even more preferably, the organic compound is relatively low boiling or otherwise easily separated from the initiator compound.

Thus, suitable organic compounds include polar materials such as, for example, monoalcohols such as methanol, ethanol, n-propanol, isopropanol and the like; polyalcohols such ethylene glycol, diethylene glycol, triethylene glycol, higher polyethylene glycols, glycerine and the like; ethers such as tetrahydrofuran and 1,4-dioxane; ketones such as acetone and methyl ethyl ketone; esters such as methyl acetate and ethyl acetate, nitrites such as acetonitrile, and dimethyl sulfoxide. A preferred organic compound is methanol.

It is preferred to minimize or even eliminate water in the solution of the metal cyanide compound.

The solution of the metal cyanide compound can be prepared in several ways. In one preparation technique, an aqueous solution of the corresponding alkali metal cyanide salt (i.e., $B_w[M^1(CN)_r(X)_t]$, where B represents an alkali metal ion) is formed. This may be performed at a slightly elevated temperature if necessary to dissolve the metal cyanide salt. The aqueous solution is mixed with a slight stoichiometric excess of a concentrated mineral acid of the form $H_d J$, where J is an anion that forms an insoluble salt with B and d is the absolute value of the valence of J. Common mineral acids such as sulfuric acid and hydrochloric acid are preferred. Sulfuric acid is preferably used at a 75% or higher concentration. Hydrochloric acid is preferably used at a 37% concentration. HCl can also be added by introducing gaseous HCl into the organic compound or by adding a solution of HCl in an appropriate solvent (such as diethyl ether or isopropanol). The salt of B and J precipitates, leaving the desired metal cyanide compound ($H_w[M^1(CN)_r(X)_t]$) in aqueous solution. The organic compound is then added, usually with stirring, preferably at a slightly elevated temperature in order to maintain the $H_w[M^1(CN)_r(X)_t]$ compound in solution. The salt of B and J separates out from the resulting solution. Because the salt of B and J is usually hygroscopic, a significant portion of the water is removed from the solution with the salt. The salt is easily separated from the supernatant liquid by filtration, centrifuging or other solid-liquid separation technique. If desired, the salt may be washed with additional quantities of the organic compound in order to recover any occluded $H_w[M^1(CN)_r(X)_t]$ compound.

A second method of preparing the solution of the metal cyanide compound is to first form a slurry of the corresponding alkali metal cyanide salt (i.e., $B_w[M^1(CN)_r(X)_t]$), in a mixture of the organic compound and a stoichiometric excess of a mineral acid, preferably hydrochloric acid. The hydrochloric acid can be supplied in various ways, such as by adding concentrated aqueous HCl, introducing gaseous HCl into the organic compound, or by adding a solution of HCl in an appropriate solvent (such as diethyl ether or isopropanol). An alkali metal salt of the acid forms and precipitates from the solution, leaving the desired $H_w[M^1(CN)_r(X)_t]$ compound dissolved in the organic compound. The precipitate is separated and if desired washed, as before.

A third convenient method of preparing the solution of the metal cyanide compound is by ion exchange. An aqueous solution of the corresponding alkali metal salt (i.e., $B_w[M^1(CN)_r(X)_t]$) is eluted through a cation exchange resin or membrane which is originally in the hydrogen ($H^+$) form. Sufficient resin is used to provide an excess of $H^+$ ions. Suitable ion exchange resins include commonly available gel or macroporous, crosslinked polystyrene cation exchange resins, such as those sold by The Dow Chemical Company under the trade names DOWEX® MSC-1, DOWEX® 50WX4, as well as AMBERLYST® 15 ion exchange resin, sold by Rohm & Haas. The column is typically eluted with water until the desired metal cyanide compound is recovered. The water is removed from the eluent, yielding the desired metal cyanide compound as solid precipitate. This precipitate is then dissolved or dispersed in the organic compound. If desired, a small amount of water may be left in the metal cyanide compound when it is mixed with the organic compound.

The metal salt is represented by the general formula $M_x A_y$. M is preferably a metal ion selected from the group consisting of $Zn^{+2}$, $Fe^{+2}$, $Co^{+2}$, $Ni^{+2}$, $Mo^{+4}$, $Mo^{+6}$, $Al^{+3}$, $V^{+4}$, $V^{+5}$, $Sr^{+2}$, $W^{+4}$, $W^{+6}$, $Mn^{+2}$, $Sn^{+2}$, $Sn^{+4}$, $Pb^{+2}$, $Cu^{+2}$, $La^{+3}$ and $Cr^{+3}$. M is more preferably $Zn^{+2}$, $Fe^{+2}$, $Co^{+2}$, $Ni^{+2}$, $La^{+3}$ and $Cr^{+3}$. M is most preferably $Zn^{+2}$.

Suitable anions A include halides such as chloride and bromide, nitrate, sulfate, carbonate, cyanide, oxalate, thiocyanate, isocyanate, perchlorate, isothiocyanate, an alkanesulfonate such as methanesulfonate, an arylenesulfonate such as p-toluenesulfonate, trifluoromethanesulfonate (triflate) and a $C_{1-4}$ carboxylate. Chloride ion is especially preferred.

Mixtures of two or more metal salts can be used. In such cases, the metals in the metal salt compounds do not have to be the same.

The solution of the metal salt usually can be prepared by directly dissolving the metal salt into an organic compound. The organic compound is as described above. In this solution, the organic compound is preferably the same as used in the metal cyanide compound solution. If a different organic compound is used, it is preferably miscible with that used in the metal cyanide compound solution.

The solutions are mixed in proportions such that at least a stoichiometric amount of the metal salt is provided, based on the amount of metal cyanide compound. Preferably about 1.2 to about 2 equivalents of metal ion (M) are delivered per equivalent of $M^1(CN)_r(X)_t$ ion (or combined equivalents of $M^1(CN)_r(X)_t$ and $M^2(X)_6$ ions, when $M^2(X)_6$ ions are present). It is preferred that the mixing be done with agitation. Agitation is preferably continued for a period after the mixing is completed. The metal cyanide catalyst, $M_b[M^1(CN)_r(X)_t]_c M^2(X)_d$, precipitates and forms a fine dispersion in the organic compound.

It has been found that catalyst performance tends to be superior when a excess of metal salt is used. Thus, if only a stoichiometric amount of metal salt is used during the precipitation step, the catalyst can be treated with additional metal salt in a subsequent step.

In the first aspect of the invention, the resulting dispersion is then mixed with an initiator compound. The initiator compound is a material having at least one heteroatom-containing group that will react with an alkylene oxide to form a covalent bond between a carbon atom of the alkylene oxide and the heteroatom, and opening the ring of the alkylene oxide to form a terminal hydroxyl group. The initiator compound is different than the inert organic compound and preferably easily separated therefrom. Suitable initiator compounds are alcohols, thiols (R—SH compounds) and aliphatic carboxylic acids. The initiator compound may contain as few as one or as many as eight or more such heteroatom-containing groups, depending on the desired nominal functionality of the product polyether. In addition, the initiator compound may contain one or more other functional groups that may be desirable in the product polyether, such as alkenyl or alkynyl unsaturation.

Suitable initiator compounds include monoalcohols such methanol, ethanol, n-propanol, isopropanol, n-butanol, isobutanol, t-butanol, 1-t-butoxy-2-propanol, octanol, octadecanol, 3-butyn-1-ol, 3-butene-1-ol, propargyl alcohol, 2-methyl-2-propanol, 2-methyl-3-butyn-2-ol, 2-methyl-3-butene-2-ol, 3-butyn-1-ol, 3-butene-1-ol and the like. The suitable monoalcohol initiator compounds include halogenated alcohols such as 2-chloroethanol, 2-bromoethanol, 2-chloro-1-propanol, 3-chloro-1-propanol, 3-bromo-1-propanol, 1,3-dichloro-2-propanol, 1-chloro-2-methyl-2-propanol as well as nitroalcohols, keto-alcohols, ester-alcohols, cyanoalcohols, and other inertly substituted alcohols. Suitable polyalcohol initiators include ethylene glycol, propylene glycol, glycerine, 1,1,1-trimethylol propane, 1,1,1-trimethylol ethane, 1,2,3-trihydroxybutane, pentaerythritol, xylitol, arabitol, mannitol, 2,5-dimethyl-3-hexyn-2,5-diol, 2,4,7,9-tetramethyl-5-decyne-4,7-diol, sucrose, sorbitol, alkyl glucosides such a methyl glucoside and ethyl glucoside and the like. Low molecular weight polyether polyols, particular those having an equivalent weight of about 350 or less, more preferably about 125–250, are also useful initiator compounds.

At least enough of the dispersion of the metal cyanide catalyst complex is added to the initiator to provide a catalytically effective amount of the catalyst complex in the initiator mixture. Thus, the amount of catalyst complex added is generally at least about 50 ppm, based on the combined weight of the initiator plus catalyst complex, preferably at least about 200 ppm, more preferably at least about 1000 ppm. It is more preferred to form a more concentrated dispersion of the metal catalyst in the initiator. Such a more concentrated dispersion can be divided and/or diluted with additional initiator when it is used to prepare a polyether. Preferably, the concentrated initiator/catalyst complex mixture will contain from about 0.2 weight percent, more preferably from about 0.5 weight percent, most preferably from about 1 weight percent, to about 50 weight percent, preferably about 25 weight percent, more preferably about 10 weight percent, metal catalyst complex, based on the combined weight of metal catalyst complex (as $M_b[M^1(CN)_r(X)_t]_c[M^2(X)_6]_d \cdot nM^3_xA_y$) and initiator.

After the metal catalyst solution and initiator are mixed, the organic compound is removed. The method of accomplishing this will depend somewhat on the particular organic compound and initiator. However, in most cases the organic compound will be more volatile than the initiator, and is conveniently stripped through the application of heat and/or vacuum.

In the second aspect of the invention, the catalyst is precipitated directly in the initiator compound. Separate solutions of the metal cyanide compound and the metal salt (both as described before) are formed in an initiator or mixture of initiators. As before, mixtures of metal cyanide compounds can be used, and an $H_wM^2(X)_6$ compound can be included if desired. Upon mixing the solutions, the catalyst precipitates to form a catalyst/initiator slurry that can be used directly in making poly(alkylene oxide) polymers and copolymers as described below. In this aspect, an amount of water or organic compound can be mixed into the starting solutions if needed to improve the dissolution of the metal cyanide compound or the metal salt. If water or organic compound is used, it is advantageously stripped from the product slurry as described before.

The resulting product is usually a fine dispersion of the metal cyanide catalyst complex in the initiator. The metal cyanide catalyst complex is present in an active form, and no other treatment or preparation is required. The metal-containing cyanide catalyst can be represented by the general formula:

wherein M, $M^1$, $M^2$, X, A, n, r, t, x and y are all as defined before, $M^3$ is defined the same way as M, b, c and d are numbers that reflect an electrostatically neutral complex, and n is a number indicating the relative number of moles of $M^3_xA_y$. $M^3$ may be the same or different than M. $M^3$ will be different from M, for example, when a stoichiometric amount of a metal salt $M_xA_y$ is used in precipitating the catalyst complex, and the precipitated catalyst is then treated with an additional quantity of an $M^3_xA_y$ salt.

Among the catalysts of particular interest are:
Zinc hexacyanocobaltate.$nZnCl_2$;
$Zn[Co(CN)_5NO].nZnCl_2$;
$Zn_s[Co(CN)_6]_o[Fe(CN)_5NO]_p.nZnCl_2$ (o, p=positive numbers, s=1.5o+p);
$Zn_s[Co(CN)_6]_o[Co(NO_2)_6]_p[Fe(CN)_5NO]_q.nZnCl_2$ (o, p, q=positive numbers, s=1.5(o+p)+q);
Zinc hexacyanocobaltate.$nLaCl_3$;
$Zn[Co(CN)_5NO].nLaCl_3$;
$Zn_s[Co(CN)_6]_o[Fe(CN)_5NO]_p.nLaCl_3$ (o, p=positive numbers, s=1.5o+p);
$Zn_s[Co(CN)_6]_o[Co(NO_2)_6]_p[Fe(CN)_5NO]_q.nLaCl_3$ (o, p, q=positive numbers, s=1.5(o+p)+q);
Zinc hexacyanocobaltate.$nCrCl_3$;
$Zn[Co(CN)_5NO].nCrCl_3$;
$Zn_s[Co(CN)_6]_o[Fe(CN)_5NO]_p.nCrCl_3$ (o, p=positive numbers, s=1.5o+p);
$Zn_s[Co(CN)_6]_o[Co(NO_2)_6]_p[Fe(CN)_5NO]_q.nCrCl_3$ (o, p, q=positive numbers, s=1.5(o+p)+q);
Magnesium hexacyanocobaltate.$nZnCl_2$;
$Mg[Co(CN)_5NO].nZnCl_2$;
$Mg_s[Co(CN)_6]_o[Fe(CN)_5NO]_p.nZnCl_2$ (o, p=positive numbers,s=1.5o+p);

$Mg_s[Co(CN)_6]_o[Co(NO_2)_6]_p[Fe(CN)_5NO]_q \cdot nZnCl_2$ (o, p, q=positive numbers, s=1.5(o+p)+q);
Magnesium hexacyanocobaltate.$nLaCl_3$;
$Mg[Co(CN)_5NO] \cdot nLaCl_3$;
$Mg_s[Co(CN)_6]_o[Fe(CN)_5NO]_p \cdot nLaCl_3$ (o, p=positive numbers, s=1.5o+p);
$Mg_s[Co(CN)_6]_o[Co(NO_2)_6]_p[Fe(CN)_5NO]_q \cdot nLaCl_3$ (o, p, q=positive numbers, s=1.5(o+p)+q);
Magnesium hexacyanocobaltate.$nCrCl_3$;
$Mg[Co(CN)_5NO] \cdot nCrCl_3$;
$Mg_s[Co(CN)_6]_o[Fe(CN)_5NO]_p \cdot nCrCl_3$ (o, p=positive numbers, s=1.5o+p);
$Mg_s[Co(CN)_6]_o[Co(NO_2)_6]_p[Fe(CN)_5NO]_q \cdot nCrCl_3$ (o, p, q=positive numbers, s=1.5(o+p)+q);
as well as the various complexes such as are described at column 3 of U.S. Pat. No. 3,404,109, incorporated herein by reference.

The catalyst complex of the invention is used to polymerize alkylene oxides to make polyethers. In general, the process includes mixing a catalytically effective amount of the catalyst/initiator dispersion with an alkylene oxide under polymerization conditions and allowing the polymerization to proceed until the supply of alkylene oxide is essentially exhausted. The concentration of the catalyst is selected to polymerize the alkylene oxide at a desired rate or within a desired period of time. An amount of catalyst sufficient to provide from about 5 to about 10,000 parts by weight metal cyanide catalyst (calculated as $M_b[M^1(CN)_r(X)_t]_c[M^2(X)_6]_d \cdot nM^3_xA_y$, exclusive of any associated water and initiator) per million parts combined weight of alkylene oxide, and initiator and comonomers, if present. More preferred catalyst levels are from about 20, especially from about 30, to about 5000, more preferably to about 1000 ppm, even more preferably to about 100 ppm, on the same basis.

Among the alkylene oxides that can be polymerized with the catalyst complex of the invention are ethylene oxide, propylene oxide, 1,2-butylene oxide, styrene oxide, and mixtures thereof. Various alkylene oxides can be polymerized sequentially to make block copolymers. More preferably, the alkylene oxide is propylene oxide or a mixture of propylene oxide and ethylene oxide and/or butylene oxide. Especially preferred are propylene oxide alone or a mixture of at least 75 weight % propylene oxide and up to about 25 weight % ethylene oxide.

In addition, monomers that will copolymerize with the alkylene oxide in the presence of the catalyst complex can be used to prepare modified polyether polyols. Such comonomers include oxetanes as described in U.S. Pat. Nos. 3,278,457 and 3,404,109, and anhydrides as described in U.S. Pat. Nos. 5,145,883 and 3,538,043, which yield polyethers and polyester or polyetherester polyols, respectively. Hydroxyalkanoates such as lactic acid, 3-hydroxybutyrate, 3-hydroxyvalerate (and their dimers), lactones and carbon dioxide are examples of other suitable monomers that can be polymerized with the catalyst of the invention.

The polymerization reaction typically proceeds well at temperatures from about 25 to about 150° C. or more, preferably from about 80–130° C. A convenient polymerization technique involves charging the catalyst dispersion to a reactor and pressurizing the reactor with the alkylene oxide. Polymerization proceeds after a short induction period as indicated by a loss of pressure in the reactor. Once the polymerization has begun, additional alkylene oxide is conveniently fed to the reactor on demand until enough alkylene oxide has been added to produce a polymer of the desired equivalent weight.

Another convenient polymerization technique is a continuous method. In such continuous processes, the activated catalyst/initiator dispersion is continuously fed into a continuous reactor such as a continuously stirred tank reactor (CSTR) or a tubular reactor. A feed of alkylene oxide is introduced into the reactor and the product continuously removed.

The catalyst of this invention is especially useful in making propylene oxide homopolymers and random copolymers of propylene oxide and up to about 15 weight percent ethylene oxide (based on all monomers). The polymers of particular interest have a hydroxyl equivalent weight of from about 800, preferably from about 1000, to about 5000, preferably about 4000, more preferably to about 2500, and unsaturation of no more than 0.02 meq/g, preferably no more than about 0.01 meq/g.

The product polymer may have various uses, depending on its molecular weight, equivalent weight, functionality and the presence of any functional groups. Polyether polyols so made are useful as raw materials for making polyurethanes. Polyethers can also be used as surfactants, hydraulic fluids, as raw materials for making surfactants and as starting materials for making aminated polyethers, among other uses.

The following examples are provided to illustrate the invention, but are not intended to limit its scope. All parts and percentages are by weight unless otherwise indicated. Catalyst loadings are based on weight of $Zn_3[Co(CN)_6]_2 \cdot nZnCl_2$, calculated from the starting materials and ignoring any associated water and initiator.

EXAMPLE 1

A. Preparation of $H_3Co(CN)_6$ Solution in Methanol $K_3Co(CN)_6$ (FW 332.35, 8.0 g, 24.07 mmol) is dissolved with slight warming (40–50° C.) in deionized water (14 g). A solution of 75% $H_2SO_4$ is prepared by slowly adding 95–98% $H_2SO_4$ (FW 98.08, 3.78 g, 38.5 mmol) to water (1.26 g). The 75% $H_2SO_4$ solution is added slowly dropwise over 5 minutes to the stirred, warm solution of $K_3Co(CN)_6$. During the addition, $K_2SO_4$ starts to precipitate from the aqueous solution as a granular white solid. The resultant slurry is stirred for 5–10 min at 40–50° C.

Methanol addition (60 mL) is then begun at the same temperature. The first 5 mL of methanol is added slowly and the slurry is stirred for 5 minutes. The rest of the methanol charge is then added slowly over 15 minutes. After the full methanol charge is added, the slurry is allowed to stir for 15 minutes, then is cooled to room temperature (25° C.). At this point, the granular $K_2SO_4$ solid (which rapidly settles to the bottom of the reactor) is filtered from the methanol supernatant, which is saved.

The $K_2SO_4$ solid is reslurried in additional methanol (25 mL) for 5 minutes at room temperature. The methanol supernatant is separated as before and combined with that previously saved. A second methanol extraction is performed in the same manner, with the supernatant again being added to that previously saved. The saved pale yellow solution of $H_3Co(CN)_6$ in methanol is transferred to a storage bottle. A very small amount of precipitate settles from this solution, and is separated out.

The final mass of the methanol solution is 109.9 g, which theoretically contains 4.8 wt % $H_3Co(CN)_6$. This methanolic solution contains some small quantity of water, as the $K_2SO_4$ does not completely dry it. The final mass of separated $K_2SO_4$ solid is 6.28 g, after drying for 3 hours @ 50° C. in a vacuum oven. The theoretical mass of the $K_2SO_4$ solid is approximately 6.52 g.

B. Preparation of Catalyst Complex

A 13.74 g portion of the $H_3Co(CN)_6$ solution prepared in part A (3.01 mmol $H_3Co(CN)_6$) is added slowly over 10 minutes with stirring to a solution of 0.82 g (6.00 mmol) $ZnCl_2$ in 10 mL of methanol. A fine white precipitate forms as soon as the $H_3Co(CN)_6$ addition is begun. After the addition is complete, the slurry is allowed to stir for 1 h.

C. Preparation of Catalyst Complex/Initiator Slurry

The slurry from part B is transferred into a stripping flask that contains 66.21 g of a nominally 700 molecular weight glycerol propoxylate (VORANOL® 2070 polyol, available from Dow Chemical). The resultant suspension of catalyst complex in methanol/initiator is stripped on a rotoevaporator at 70–75° C. under house (25–26 inches Hg) vacuum to remove volatiles (primarily methanol). A final strip is performed for up to 1 hour at 70–75° C./<30 inches Hg vacuum with a nitrogen sweep to more effectively dry the catalyst complex/initiator slurry. The resulting product is 67.21 g of a highly dispersed, white, translucent, essentially opaque suspension of the catalyst complex in the initiator. The product contains from 1.5–2.0% by weight catalyst (as $Zn_3[Co(CN)_6]_2 \cdot nZnCl_2$).

D. Polymerization of Propylene Oxide

The catalyst/initiator slurry from part C is evaluated in reactions with additional amounts of the same initiator (VORANOL® 2070 polyol, 0.12 g) and propylene oxide (0.58 g) in a sealed glass vial. First, the vial is charged with 0.12 g of the same initiator, 0.58 g of propylene oxide and enough of the catalyst/initiator slurry from part C to provide 103 ppm of catalyst (assuming 2.0% concentration of catalyst in the slurry). The vial is sealed and heated to 90° C. for 18 hours. After a couple of hours at the polymerization temperature, the reaction mixture is observed to have become a thick but stirrable mixture, indicating that substantial polymerization has occurred. After 18 hours, essentially quantitative consumption of the propylene oxide has occurred. Gel permeation chromatography (GPC) analysis of the product confirms the presence of higher molecular weight poly(propylene glycol) with no peak corresponding to unreacted initiator.

When this experiment is repeated, this time with 485 ppm catalyst, the reaction mixture is visibly thickened within 30 minutes. Quantitative consumption of the propylene occurs within 18 hours, as confirmed by GPC analysis.

EXAMPLE 2

A. Preparation of $H_3Co(CN)_6$ Solution in Methanol

An ion exchange column is prepared from 100 g (dry weight) of DOWEX® MSC-1 (a macroporous sulfonated styrene-divinylbenzene copolymer in the $H^+$ form, capacity 4.9 meq $H^+$/g). The resin provides approximately 0.49 equivalents of $H^+$ ion. The column dimensions are approximately 1 inch diameter×12–13 inches high. The packed column is eluted extensively with water to remove color, maintaining a liquid layer above the column at all times.

$K_3Co(CN)_6$ (10.0 g, 30.09 mmol) is dissolved in 90 grams of deionized water. The $K_3Co(CN)_6$ solution is added to the top of the packed ion exchange column and solute is allowed to elute from the column. The column is further eluted with water (400 mL total in 4×100 mL portions). The eluents are combined, providing a pale yellow solution (approximately 500 mL total). The eluent solution is stripped (70–75° C./25–30 inches Hg) on a rotoevaporator to remove water. A solid, off-white precipitate forms late in the distillation. The precipitate is further stripped at 70–75° C./<30 inches Hg vacuum to dry the residue to a flaky off-white solid. The final mass of the solid $H_3Co(CN)_6$ is 6.41 g, which compares well to a theoretical mass of 6.56 g. The solid is mixed with about 226.6 g of methanol to form a mixture containing about 2.75 wt % $H_3Co(CN)_6$. The resulting mixture is slightly hazy, indicating incomplete dissolution of the $H_3Co(CN)_6$.

B. Preparation of Catalyst Complex 23.3 grams of the $H_3Co(CN)_6$ solution from part A (03.01 mmol $H_3Co(CN)_6$) is added slowly over 10 minutes with stirring to a solution of 0.82 g (6.00 mmol) of $ZnCl_2$ in 10 mL methanol. A fine white precipitate forms as soon as the $H_3Co(CN)_6$ addition is begun. After the addition is complete the slurry is allowed to stir for 1 h.

C. Preparation of Catalyst Complex/Initiator Slurry

The slurry from part B is transferred into a stripping flask that contains 66.22 g of initiator (VORANOL® 2070 polyether polyol). The resultant suspension is stripped on a rotoevaporator at 70–75° C. under house (25–26 inches Hg) vacuum to remove volatiles. A final strip is performed for up to 1 hour at 70–75° C./<30 inches Hg vacuum with a nitrogen sweep. The final mass of the suspension is 67.15 g. It appears as a highly dispersed translucent/white, essentially opaque suspension. The suspension contains about 1.5–2.0% catalyst (as $Zn_3[Co(CN)_6]_2 \cdot nZnCl_2$).

D. Polymerization of Propylene Oxide

The catalyst/initiator slurry from part C is evaluated in the same manner as described in Example 1D. At a catalyst loading of 105 ppm essentially quantitative (99%) consumption of the propylene oxide occurs in 18 hours. Gel permeation chromatography (GPC) analysis of the product confirms the presence of higher molecular weight poly(propylene glycol) with no peak corresponding to unreacted initiator.

When this experiment is repeated, this time with 501 ppm catalyst, the reaction mixture is visibly thickened within 30 minutes. Quantitative consumption of the propylene occurs within 18 hours, as confirmed by GPC analysis.

EXAMPLE 3

A. Preparation of $H_3Co(CN)_6$ Solution in Methanol/2-propanol $K_3Co(CN)_6$ (FW 332.35, 8.0 g, 24.1 mmol) is added to an Erlenmeyer flask along with a magnetic stir bar. Methanol (50 mL) is added and the slurry of yellowish $K_3Co(CN)_6$ solid is stirred rapidly with the magnetic stirrer. A solution of hydrogen chloride in 2-propanol (5–6 Normal HCl in 2-propanol, 39.4 g, 43.3 mL, approximately 217 mmol HCl) is then added slowly over 10–15 minutes. A finely divided white solid is produced as the HCl is added to the $K_3Co(CN)_6$ slurry. The flask is capped with a rubber septum and the mixture is stirred overnight at room temperature.

After overnight reaction, the mixture consists primarily of finely divided white solid along with a small amount of unconverted yellowish solid $K_3Co(CN)_6$ in a very pale yellow solution. The insoluble solids are separated by vacuum filtration using Whatman® #1 filter paper. The solids are rinsed twice with 5–10 mL (each wash) of fresh methanol. The resultant clear, very pale yellow solution of $H_3Co(CN)_6$ in methanol/2-propanol is transferred to a storage bottle. The final mass of the filtrate is 95.7 g, which theoretically contains a maximum (assuming complete reaction) of 5.5 wt % $H_3Co(CN)_6$. The final mass of separated solid (KCl) is 5.44 g, after drying for 3 hours @ 50° C. in a vacuum oven. This compares well with the theoretical mass of KCl, i. e., approximately 5.39 g.

B. Preparation of Catalyst Complex

An 11.96 g portion of the $H_3Co(CN)_6$ solution prepared in part A (a maximum of 3.01 mmol $H_3Co(CN)_6$) is added slowly over 5–10 minutes with stirring to a solution of 0.82 g (6.00 mmol) $ZnCl_2$ in 5 mL of 2-propanol. A fine white precipitate forms as soon as the $H_3Co(CN)_6$ addition is begun. After the addition is complete, the resultant slurry is allowed to stir for 1.5 h. An additional 10–15 mL of 2-propanol is added to reduce the viscosity of the slurry.

C. Preparation of Catalyst Complex/Initiator Slurry

The slurry from part B is transferred into a stripping flask that contains 66.22 g of initiator (VORANOL® 2070 polyether polyol). The resultant suspension is stripped on a rotoevaporator at 70–75° C. under house (25–26 inches Hg) vacuum to remove volatiles (primarily methanol and 2-propanol). A final strip is performed for up to 1 hour at 70–75° C./<30 inches Hg vacuum with a nitrogen sweep to more effectively dry the catalyst complex/initiator slurry. The resulting product is 67.35 g of a highly dispersed, slightly yellowish, translucent essentially opaque suspension of the catalyst complex in the initiator. The product contains from 1.5–2.0% catalyst (as $Zn_3[Co(CN)_6]_2 \cdot nZnCl_2$).

D. Polymerization of Propylene Oxide

The catalyst/initiator slurry from part C is evaluated in the same manner as described in Example 1D. At a catalyst loading of about 100 ppm (assuming a concentration of 2.0% in the initiator), 77% of the propylene oxide is converted to polymer in 18 hours.

When this experiment is repeated, this time with 433 ppm catalyst, the reaction mixture is visibly thickened within 30 minutes and quantitative consumption of the propylene occurs within 18 hours, as confirmed by GPC analysis.

EXAMPLE 4

A. Azeotropic Drying of $H_3Co(CN)_6$ and Preparation of $H_3Co(CN)_6$ Solution in Methanol A 11.96 g portion of the $H_3Co(CN)_6$ solution prepared in Example 3A (a maximum of 3.01 mmol $H_3Co(CN)_6$) is stripped on a rotoevaporator at 70–75° C. under house (25–26 inches Hg) vacuum to remove volatiles (primarily methanol and 2-propanol). To remove water, the resultant white solid is twice suspended in approximately 20 mL of 2-propanol and each time the volatiles are removed on the rotoevaporator. The solid product (0.91 g) is redissolved in methanol (35 mL) to provide a pale yellow, slightly hazy solution.

B. Preparation of Catalyst Complex

The methanolic $H_3Co(CN)_6$ solution prepared in Example 4A (a maximum of 3.01 mmol $H_3Co(CN)_6$) is added slowly over 5–10 minutes with stirring to a solution of 0.82 g (6.00 mmol) $ZnCl_2$ in 5 mL of methanol. A fine white precipitate forms as soon as the $H_3Co(CN)_6$ addition is begun. After the addition is complete, the slurry is allowed to stir for 1.5 h.

C. Preparation of Catalyst Complex/Initiator Slurry

The slurry from part B is transferred into a stripping flask that contains 66.21 g of a nominally 700 molecular weight glycerol propoxylate (VORANOL® 2070 polyol). The resultant suspension of catalyst complex in methanol/initiator is stripped on a rotoevaporator at 70–75° C. under house (25–26 inches Hg) vacuum to remove volatiles. A final strip is performed for up to 1 hour at 70–75° C./<30 inches Hg vacuum with a nitrogen sweep to more effectively dry the catalyst complex/initiator slurry. The resulting product is 67.29 g of a white, highly dispersed, translucent and essentially opaque suspension of the catalyst complex in the initiator. The product contains about 1.5–2.0% catalyst (as $Zn_3[Co(CN)_6]_2 \cdot nZnCl_2$).

D. Polymerization of Propylene Oxide

The catalyst/initiator slurry from part C is evaluated in the same manner as described in Example 1D. At a catalyst loading of about 115 ppm of catalyst (assuming a concentration of 2.0% in the initiator), substantial polymerization is observed after two hours, and 89% of the propylene oxide is converted to polymer in 18 hours.

When this experiment is repeated, this time with 507 ppm catalyst, the reaction mixture is visibly thickened within 30 minutes. Quantitative consumption of the propylene occurs within 18 hours, as confirmed by GPC analysis.

EXAMPLE 5

A. Preparation of Catalyst Complex

A 5.98 g portion of the $H_3Co(CN)_6$ solution prepared in Example 3A (1.50 mmol $H_3Co(CN)_6$) is added slowly over 5–10 minutes with stirring to a solution of 0.41 g (3.00 mmol) $ZnCl_2$ in 5 mL of methanol. A fine white precipitate forms as soon as the $H_3Co(CN)_6$ addition is begun. After the addition is complete, the slurry is allowed to stir for 0.5 h.

B. Preparation of Catalyst Complex/Initiator Slurry

The slurry from part A is transferred into a stripping flask that contains 33.10 g of glycerol. The resultant suspension of catalyst complex in methanol/initiator is stripped on a rotoevaporator at 70–75° C. under house (25–26 inches Hg) vacuum to remove volatiles. A final strip is performed for up to 45 minutes at 70–75° C./<30 inches Hg vacuum with a nitrogen sweep to more effectively dry the catalyst complex/initiator slurry. The resulting product is 33.72 g of a white, highly dispersed, translucent and essentially opaque suspension of the catalyst complex in the glycerol initiator. The product about 1.5–2.0% catalyst (as $Zn_3[CO(CN)_6]_2 \cdot nZnCl_2$).

C. Polymerization of Propylene Oxide

The catalyst/initiator slurry from part B is evaluated in the same manner as described in Example 1D. At a catalyst loading of about 535 ppm of catalyst (assuming a concentration of 2.0% in the initiator), substantial polymerization is observed within two hours. 88% of the propylene oxide is converted to polymer in 18 hours, as confirmed by GPC analysis.

EXAMPLE 6

A. Solvent Exchange of Methanol/2-propanol $H_3Co(CN)_6$ Solution into Glycerol Solvent A 5.98 g portion of the $H_3Co(CN)_6$ solution prepared in Example 3A (1.50 mmol $H_3Co(CN)_6$) is added to a stripping flask containing glycerol (16.56 g). The mixture is stripped on a rotoevaporator at 70–75° C. under house (25–26 inches Hg) vacuum to remove volatiles.

B. Preparation of Catalyst Complex

Zinc chloride (0.41 g, 3.0 mmol) is added to glycerol (16.96 g) and methanol (10 mL) and the mixture is stirred with mild warming. The glycerol/$H_3Co(CN)_6$ solution prepared in Example 6A is added slowly over 5–10 minutes with stirring to the $ZnCl_2$ solution. A fine white precipitate forms as soon as the $H_3Co(CN)_6$ addition is begun. After the addition is complete, the flask containing the glycerol/$H_3Co(CN)_6$ solution is rinsed with a small amount (5 mL) of methanol and the rinse is likewise added to the product slurry. The slurry is allowed to stir for 1 h.

The resultant suspension of catalyst complex in methanol/glycerol initiator is stripped on a rotoevaporator at 70–75° C. under house (25–26 inches Hg) vacuum to remove methanol and other volatiles. A final strip is performed for up to 45 minutes at 70–75° C./<30 inches Hg vacuum with a nitrogen sweep to more effectively dry the catalyst complex/initiator slurry. The resulting product is 33.92 g of a white, highly dispersed, translucent and essentially opaque suspension of the catalyst complex in the glycerol initiator. The product contains from 1.5–2.0% catalyst (as $Zn_3[Co(CN)_6]_2 \cdot nZnCl_2$).

Polymerization of Propylene Oxide

The catalyst/initiator slurry from part B is evaluated in the same manner as described in Example 1D. At a catalyst loading of about 526 ppm of catalyst (assuming a concentration of 2.0% in the initiator), 13% of the propylene oxide is converted to polymer in 18 hours.

EXAMPLE 7

A. Preparation of $H_3Co(CN)_6$ Solution in Aqueous Solution with 2-propanol Extraction of Product

$K_3Co(CN)_6$ (FW 332.35, 8.0 g, 24.1 mmol) and 16 mL of water are added to an Erlenmeyer flask. The mixture is stirred with slight warming until the solid dissolves. A solution of concentrated hydrochloric acid (approximately 37 wt % aqueous HCl, 21.3 g of solution, approximately 217 mmol HCl) is then added slowly over 10–15 minutes. The mixture is allowed to stir for approximately 2 hours and 2-propanol (75 mL) is then added to the solution. A finely divided white solid is produced as the 2-propanol is added to the solution/slurry. The flask is capped with a rubber septum and the mixture is stirred overnight at room temperature.

After overnight reaction, the mixture consists primarily of finely divided white solid in a very pale yellow solution. The insoluble solids are separated by vacuum filtration using Whatman® #1 filter paper and the solids are rinsed twice with 5–10 mL (each time) of fresh 2-propanol. When the 2-propanol rinses are combined with the previously clear filtrate, some solid precipitates from solution. The cloudy combined filtrates are filtered again. The resultant clear, very pale yellow solution of $H_3Co(CN)_6$ in 2-propanol (plus incipient water) is transferred to a storage bottle. The final mass of the 2-propanol filtrate is 107.5 g which theoretically contains a maximum of 4.9 wt % $H_3Co(CN)_6$. The final mass of the separated solid (KCl) is 6.03 g after drying for 3 hours @ 50° C. in a vacuum oven). The theoretical mass of KCl is approximately 5.39 g. As more mass (KCl) than expected is recovered, it is believed that the salt cake contains some residual $H_3Co(CN)_6$ and/or a mixture of potassium salts of $H_3Co(CN)_6$.

B. Preparation of Catalyst Complex

A 13.4 g portion of the $H_3Co(CN)_6$ solution prepared in part A (a maximum of 3.01 mmol $H_3Co(CN)_6$) is added slowly over 5–10 minutes with stirring to a solution of 0.82 g (6.00 mmol) $ZnCl_2$ in 5 mL of 2-propanol. A fine white precipitate forms as soon as the $H_3Co(CN)_6$ addition is begun. After the addition is complete, the slurry is allowed to stir for 1.5 h.

C. Preparation of Catalyst Complex/Initiator Slurry

The slurry from part B is transferred into a stripping flask that contains 66.2 g of a nominally 700 molecular weight glycerol propoxylate (VORANOL® 2070 polyol). The resultant suspension of catalyst complex in 2-propanol/initiator is stripped on a rotoevaporator at 70–75° C. under house (25–26 inches Hg) vacuum to remove volatiles. A final strip is performed for up to 1.5 hour at 70–75° C./<30 inches Hg vacuum with a nitrogen sweep to more effectively dry the catalyst complex/initiator slurry. The resulting product is 67.1 g of a highly dispersed, white, translucent and essentially opaque suspension of the catalyst complex in the initiator. The product contains about 1.5–2.0% catalyst (as $Zn_{3[Co(CN)6]2} \cdot nZnCl_2$).

D. Polymerization of Propylene Oxide

The catalyst/initiator slurry from part C is evaluated in the same manner as described in Example 1D. At a catalyst loading of about 110 ppm of catalyst (assuming a concentration of 2.0% in the initiator), 27% of the propylene oxide is converted to polymer in 18 hours, as confirmed by GPC analysis.

When this experiment is repeated, this time with about 537 ppm catalyst, the reaction mixture is visibly thickened within 30 minutes. Quantitative consumption of the propylene occurs within 18 hours, as confirmed by GPC analysis.

EXAMPLE 8

A. Preparation of $H_3Co(CN)_6$ Solution in Methanol Using a Slurry Process

$K_3Co(CN)_6$ (FW 332.35, 1.00 g, 3.01 mmol) and methanol (15 mL) are added to an Erlenmeyer flask and stirred rapidly. A solution of concentrated aqueous hydrochloric acid solution (approximately 37 wt % HCl, 2.00 g solution, approximately 20.3 mmol HCl) is then added. A finely divided white solid is produced. The flask is capped with a rubber septum and the mixture is stirred overnight at room temperature.

After overnight reaction, the mixture consists primarily of finely divided white solid in a very pale yellow, nearly colorless solution. The upper supernatant solution is decanted from the insoluble solid taking care to not transfer any solid with the solution. The solid is then slurried with about 5 mL of fresh methanol. The methanol rinse is filtered through a syringe filter cartridge and combined with the decanted methanol solution.

B. Preparation of Catalyst Complex

The $H_3Co(CN)_6$ solution prepared in part A (maximum 3.01 mmol $H_3Co(CN)_6$) is added slowly over 1 minute with stirring to a solution of 0.82 g (6.00 mmol) $ZnCl_2$ in 5 mL of methanol. A fine white precipitate forms as soon as the $H_3Co(CN)_6$ addition is begun. After the addition is complete, the slurry is allowed to stir for 1 h.

C. Preparation of Catalyst Complex/Initiator Slurry

The slurry from part B is transferred into a stripping flask that contains 66.15 g of a nominally 700 molecular weight glycerol propoxylate (VORANOL® 2070 polyol). The resultant suspension of catalyst complex in methanol/initiator is stripped on a rotoevaporator at 70–75° C. under house (25–26 inches Hg) vacuum to remove volatiles (primarily methanol and water). A final strip is performed for up to 1 hour at 70–75° C./<30 inches Hg vacuum with a nitrogen sweep to more effectively dry the catalyst complex/initiator slurry. The resulting product is 67.15 g of a highly dispersed, white, translucent and essentially opaque suspension of the catalyst complex in the initiator. The product contains about 1.5–2.0% catalyst (as $Zn_3[Co(CN)_6]_2 \cdot nZnCl_2$).

D. Polymerization of Propylene Oxide

The catalyst/initiator slurry from part C is evaluated in the same manner as described in Example 1D. At a catalyst loading of about 119 ppm of catalyst (assuming a concentration of 2.0% in the initiator), 91% of the propylene oxide is converted to polymer in 18 hours, as confirmed by GPC analysis.

When this experiment is repeated with 510 ppm and again with 1049 ppm catalyst, in each case the reaction mixture is visibly thickened within 30 minutes, and quantitative consumption of the propylene occurs within 18 hours, as confirmed by GPC analysis.

EXAMPLE 9

A. Preparation of $H_3Co(CN)_6$ Solution in Methanol

$K_3Co(CN)_6$ (FW 332.35, 4.00 g, 12.0 mmol) is dissolved with slight warming in deionized water (8 g). A solution of $H_2SO_4$ is prepared by slowly adding 95–98% $H_2SO_4$ (FW 98.08, 1.88 g, 19.2 mmol) to water (1.88 g). The $H_2SO_4$ solution is added dropwise over 5–10 minutes to the stirred solution of $K_3Co(CN)_6$. The resultant clear solution is stirred for 5–10 minutes.

Methanol addition (75 mL total) is then begun at ambient temperature. The first 5 mL of methanol is added slowly with a white precipitate forming as the methanol is added. The slurry is stirred for 5 minutes. The rest of the methanol charge is then added slowly over 15 minutes. After the full methanol charge (75 mL total) is added, the slurry is allowed to stir for 15 minutes. At this point, the methanol supernatant is separated from the granular $K_2SO_4$ solid (which rapidly settles to the bottom of the reactor), and is removed by filtration.

The K$_2$SO$_4$ solid is reslurried in additional methanol (25 mL) for 5 minutes at room temperature and the methanol supernatant is separated as before. This K$_2$SO$_4$ salt reslurry is repeated once more (25 mL methanol) for a total of two slurry extractions of the K$_2$SO$_4$ salt cake. The resultant pale yellow solution of H$_3$Co(CN)$_6$ in methanol is transferred to a storage bottle. A very small amount of precipitate settles from this solution when cold, but it redissolves at room temperature.

The final mass of the very pale yellow methanol solution is 93.6 g, which theoretically contains 2.8 wt % H$_3$Co(CN)$_6$. This methanolic solution contains some small quantity of water, as the K$_2$SO$_4$ does not completely dry the methanolic solution. The final mass of separated K$_2$SO$_4$ solid is 3.18 g, after drying for 3 hours @ 50° C. in a vacuum oven. The theoretical mass of K$_2$SO$_4$ is approximately 3.25 g.

B. Preparation of Catalyst Complex

A 23.40 g portion of the H$_3$Co(CN)$_6$ solution prepared in part A (maximum 3.01 mmol H$_3$Co(CN)$_6$) is added over 10 minutes with stirring to a solution of 0.82 g (6.00 mmol) ZnCl$_2$ in 10 mL of methanol. A fine white precipitate forms as soon as the H$_3$Co(CN)$_6$ addition is begun. After the addition is complete, the slurry is allowed to stir for 1 h.

C. Preparation of Catalyst Complex/Initiator Slurry

The slurry from part B is transferred into a stripping flask that contains 66.20 g of a nominally 700 molecular weight glycerol propoxylate (VORANOL® 2070 polyol). The resultant suspension of catalyst complex in methanol/initiator is stripped on a rotoevaporator at 70–75° C. under house (25–26 inches Hg) vacuum to remove volatiles (primarily methanol). A final strip is performed for up to 1 hour at 70–75° C./<30 inches Hg vacuum with a nitrogen sweep to more effectively dry the catalyst complex/initiator slurry. The resulting product is 67.11 g of a highly dispersed, white translucent essentially opaque suspension of the catalyst complex in the initiator. The product contains from 1.5–2.0% catalyst (as Zn$_3$[Co(CN)$_6$]$_2$.nZnCl$_2$).

D. Polymerization of Propylene Oxide

The catalyst/initiator slurry from part C is evaluated in the same manner as described in Example 1D. At a catalyst loading of about 96 ppm of catalyst (assuming a concentration of 2.0% in the initiator), substantial polymerization occurs within two hours. 77% of the propylene oxide is converted to polymer in 18 hours, as confirmed by GPC analysis.

When this experiment is repeated, this time with 498 ppm catalyst, the reaction mixture is visibly thickened within 30 minutes. Quantitative consumption of the propylene occurs within 18 hours, as confirmed by GPC analysis.

What is claimed is:

1. A method for preparing an active metal cyanide catalyst, comprising
    (I) mixing;
        a) a solution or dispersion of a metal cyanide compound in a first inert organic compound or mixture thereof, wherein the metal cyanide compound is represented by the general formula H$_w$[M$^1$(CN)$_r$(X)$_t$] wherein M$^1$ is a transition metal ion;
        each X represents a group other than cyanide that coordinates with the M$^1$ ion;
        r is from 4 to 6, t is from 0–2, and w represents the absolute value of the valence of the M$^1$(CN)$_r$(X)$_t$ group; and
        b) a solution or dispersion of a metal salt in a second inert organic compound or mixture thereof, wherein the metal salt is represented by the general formula M$_x$A$_y$, wherein M is a metal ion that forms an insoluble precipitate with the metal cyanide grouping M$^1$(CN)$_r$(X)$_t$, A represents an anion, and x and y are integers that balance the charges in the metal salt, and said second inert organic compound is the same as or miscible with said first organic compound or mixture thereof,
        said mixing being performed under conditions such that a precipitate forms and is suspended in said first and second organic compounds;
    (II) dispersing the resulting mixture in an initiator compound, and
    (III) removing said first organic compound or mixture and said second organic compound or mixture to form a dispersion of a finely divided metal cyanide catalyst in the initiator compound.

2. The method of claim 1 wherein said metal cyanide compound includes H$_3$Co(CN)$_6$.

3. The method of claim 1 wherein the metal salt is a zinc salt.

4. The method of claim 3 wherein the initiator is a polyalcohol.

5. The method of claim 4 wherein the first and second inert organic compounds are each an alcohol.

6. The method of claim 5 wherein the first and second inert organic compound are the same.

7. The method of claim 6 wherein the first and second inert organic compound are methanol, ethanol, n-propanol or isopropanol.

8. The method of claim 7 wherein the initiator compound is a low molecular weight polyether polyol having an equivalent weight of about 125–250.

9. The method of claim 8 wherein said solution or dispersion of a metal cyanide compound further contains a compound of the formula H$_w$M$^2$(X)$_6$ wherein w is 2 or 3, M$^2$ is a transition metal and X is a group other than cyanide that coordinates with the M$^2$ ion.

10. The method of claim 1, wherein said first inert organic compound or mixture and said second inert organic compound or mixture are more volatile than the initiator, and are removed in step (III) by application of heat or vacuum or both.

* * * * *